(12) United States Patent
Sinclair et al.

(10) Patent No.: US 7,213,025 B2
(45) Date of Patent: May 1, 2007

(54) PARTITIONED DATABASE SYSTEM

(75) Inventors: Paul L. Sinclair, Manhattan Beach, CA (US); Donald Pederson, San Diego, CA (US); Steven Bart Cohen, Redondo Beach, CA (US)

(73) Assignee: NCR Corporation, Dayton, OH (US)

( * ) Notice: Subject to any disclaimer, the term of this patent is extended or adjusted under 35 U.S.C. 154(b) by 863 days.

(21) Appl. No.: 09/981,613

(22) Filed: Oct. 16, 2001

(65) Prior Publication Data
US 2003/0074348 A1 Apr. 17, 2003

(51) Int. Cl.
*G06F 7/00* (2006.01)

(52) U.S. Cl. ............... 707/101; 707/100; 707/104.1

(58) Field of Classification Search .......... 707/1–10, 707/100–104.1, 200–204; 709/203
See application file for complete search history.

(56) References Cited

U.S. PATENT DOCUMENTS

| | | | |
|---|---|---|---|
| 5,121,494 A | | 6/1992 | Dias et al. ............... 707/2 |
| 5,404,510 A * | | 4/1995 | Smith et al. ............. 707/2 |
| 5,515,531 A * | | 5/1996 | Fujiwara et al. ......... 707/3 |
| 5,537,475 A * | | 7/1996 | Micali ..................... 380/30 |
| 5,555,404 A * | | 9/1996 | Torbjørnsen et al. ... 707/202 |
| 5,721,907 A * | | 2/1998 | Pyne ....................... 707/10 |
| 5,765,146 A | | 6/1998 | Wolf et al. .............. 707/2 |
| 5,787,411 A * | | 7/1998 | Groff et al. ............. 707/2 |
| 5,835,755 A * | | 11/1998 | Stellwagen, Jr. ....... 707/3 |
| 5,860,070 A * | | 1/1999 | Tow et al. ............... 707/8 |
| 5,960,086 A * | | 9/1999 | Atalla ...................... 380/44 |
| 5,960,431 A * | | 9/1999 | Choy ....................... 707/7 |
| 6,081,801 A * | | 6/2000 | Cochrane et al. ....... 707/3 |
| 6,105,026 A * | | 8/2000 | Kruglikov et al. ...... 707/8 |
| 6,115,705 A * | | 9/2000 | Larson .................... 707/3 |
| 6,223,182 B1 | | 4/2001 | Agarwal et al. ........ 707/102 |
| 6,226,634 B1 * | | 5/2001 | Ogihara et al. ......... 707/4 |
| 6,349,310 B1 * | | 2/2002 | Klein et al. ............. 707/200 |
| 6,370,529 B1 * | | 4/2002 | Kruglikov et al. ...... 707/8 |
| 6,401,098 B1 * | | 6/2002 | Moulin .................... 707/102 |
| 6,421,662 B1 * | | 7/2002 | Karten ..................... 707/3 |
| 6,493,699 B2 * | | 12/2002 | Colby et al. ............. 707/2 |
| 6,578,039 B1 * | | 6/2003 | Kawamura .............. 707/100 |
| 2002/0016922 A1 * | | 2/2002 | Richards et al. ........ 713/200 |
| 2002/0032676 A1 * | | 3/2002 | Reiner et al. ........... 707/3 |
| 2002/0099691 A1 * | | 7/2002 | Lore et al. ............... 707/2 |
| 2002/0165727 A1 * | | 11/2002 | Greene et al. .......... 705/1 |

* cited by examiner

*Primary Examiner*—Don Wong
*Assistant Examiner*—Linh Black
(74) *Attorney, Agent, or Firm*—Howard Speight

(57) ABSTRACT

Implementations of a partitioned database system and a method of using a database system are disclosed. One system implementation includes storage facilities. Each storage facility includes data from database table rows. The database table rows in each storage facility that correspond to a specific database table are logically ordered according to a row identifier (row ID). The row ID includes a first value that is based on one or more columns of the table. The row ID also includes a second value that is based on one or more columns of the table, which may be different from or the same as those on which the first value is based. The first value of the row ID is predominate in determining the order of the rows in the storage facilities. The second value determines the order of those rows with identical first values.

3 Claims, 6 Drawing Sheets

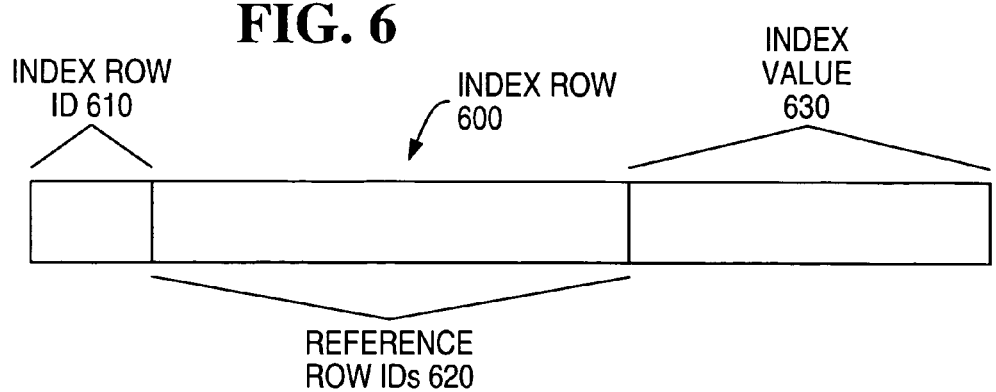
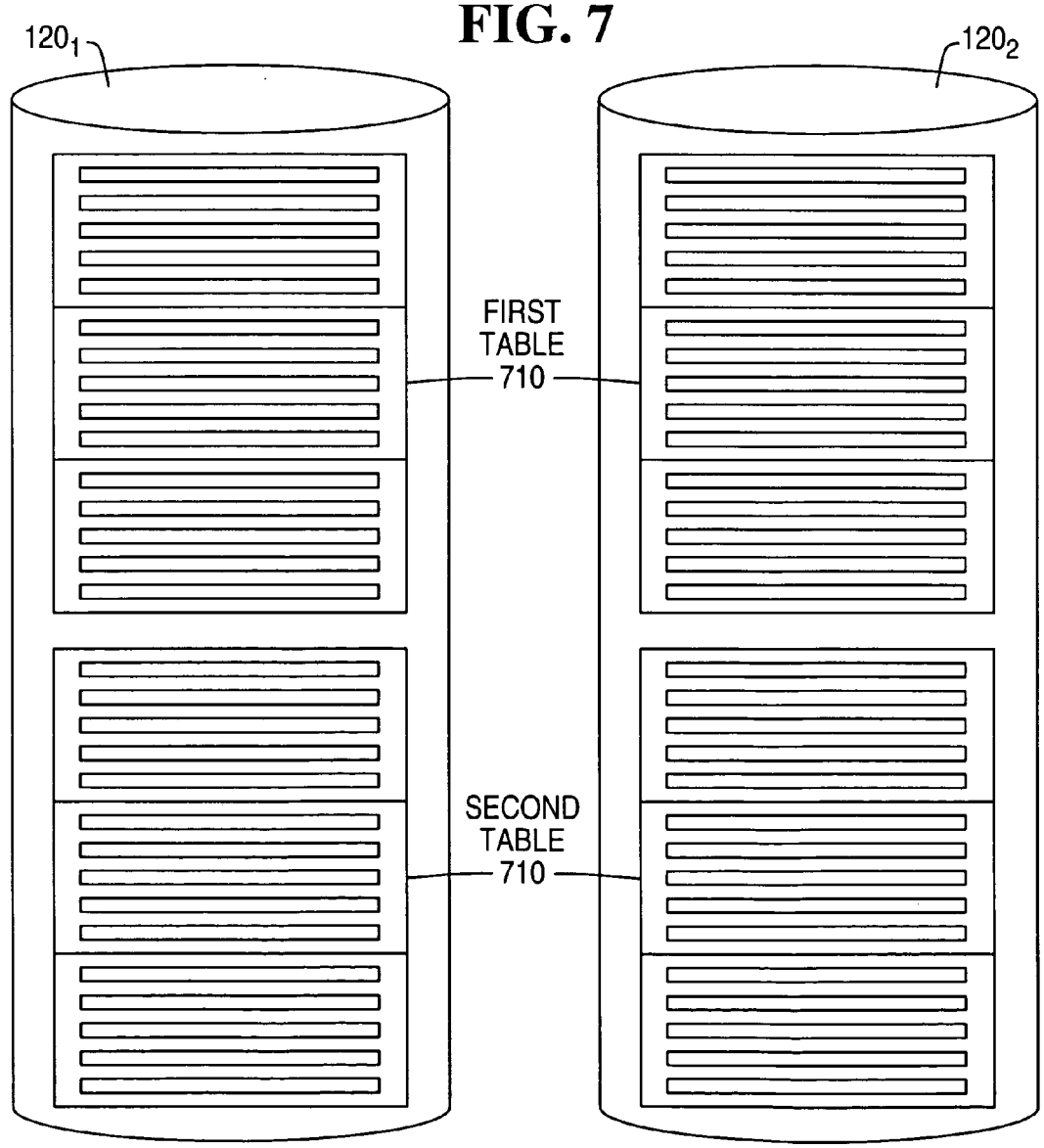

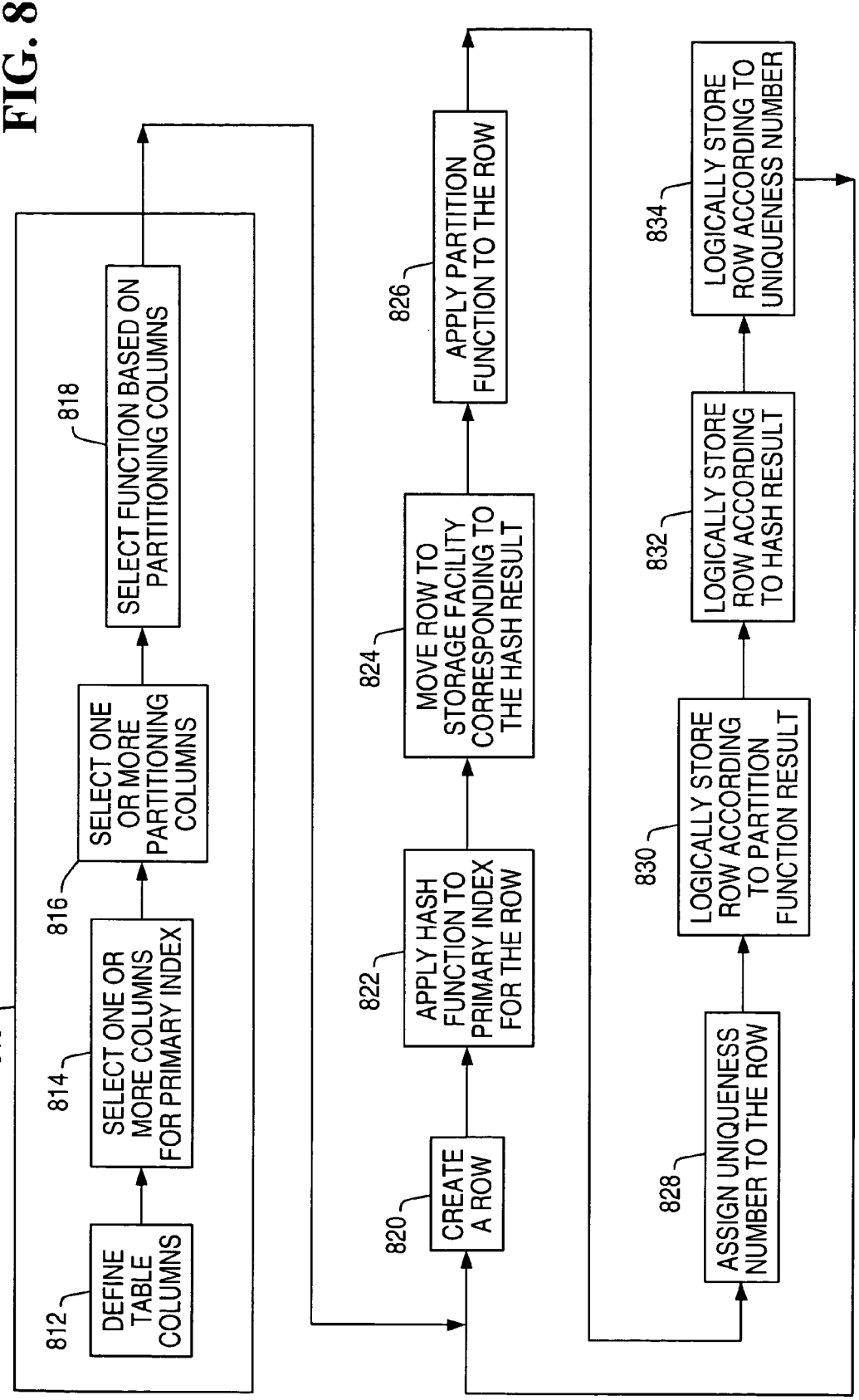

PARTITIONED DATABASE SYSTEM

BACKGROUND

Data organization is important in relational database systems that deal with complex queries against large volumes of data. Relational database systems allow data to be stored in tables that are organized as both a set of columns and a set of rows. Standard commands are used to define the columns and rows of tables and data is subsequently entered in accordance with the defined structure. The defined table structure is logically maintained, but may not correspond to the physical organization of the data. For example, the data corresponding to a particular table may be split up among a number of physical hardware storage facilities.

Users of relational database systems require the minimum time possible for execution of complex queries against large amounts of data. Different physical types of storage, for example random access memory and hard drives, incur different length delays. In addition, writing to memory or a hard drive is often slower than reading an equivalent amount of data from memory or a hard drive. The organization of data corresponding to tables defined in a relational database system may determine the number of writes and reads that need to be performed in order to execute a common query. If the data is properly organized, performance can be improved by searching a part of the data for queries that can take advantage of that organization. If the data is not organized in a useful way for a query, it will often need to be searched in its entirety to satisfy a query or copied and restructured into a useful organization.

SUMMARY

In general, in one aspect, the invention features a system having storage facilities. Each storage facility that include data from database table rows. The database table rows in each storage facility that correspond to a specific database table are logically ordered according to a row identifier (row ID). The row ID includes a first value that is based on one or more columns of the table. The row ID also includes a second value that is based on one or more columns of the table, which may be different from or the same as those on which the first value is based. The first value of the row ID is predominate in determining the order of the rows in the storage facilities. The second value determines the order of those rows with identical first values. In a more specific implementation, the row ID also includes a third value and that third value determines the order of rows with identical first and second values. The third value is a uniqueness number that differentiates rows having equal first and second values.

In general, in one aspect, the invention features a method for building a partitioned database system. Columns for a database table are defined. A first group of one or more columns is selected. A first function based on values in each column of the first group of columns is selected. A second group of one or more columns is selected. The second group can be the same as or different from the first group. A second function based on values in each column of the second group of columns is selected. Rows for the table are created. The rows are stored in one or more storage facilities in a logical order corresponding to the result of the first function for each row. If more than one row of the table has an identical result of the first function, those rows are stored in a logical order corresponding to the result of the second function. In a more specific implementation, if a plurality of rows of the table in a storage facility have identical results of the first and second functions, those rows are stored in a logical order corresponding to a third value for each of those rows. In another implementation, the method can be implemented on a computer by a program.

In general, in one aspect, the invention features a method for storing a row identification (row ID) in a data row structure. The data row includes a header and a body. The state of at least one bit in the header is set based on whether the row is part of a partitioned or unpartitioned table. A first portion of the row ID is included in the header. If the state of the at least one bit indicates a partitioned table, a second portion of the row ID is included in the body of the data row. A specified second portion is assumed for a data row when the state of the at least one bit indicates a nonpartitioned table. In a more specific implementation, the second portion includes a first value and the first portions includes a second value and a third value.

Other features and advantages will become apparent from the description and claims that follow.

BRIEF DESCRIPTION OF THE DRAWINGS

FIG. 6 is a data structure for an index row.
FIG. 7 illustrates example storage facilities with partitioned database tables.
FIG. 8 is a flow chart of an algorithm for defining and building a partitioned table in a database system.

DETAILED DESCRIPTION

Figure 1:
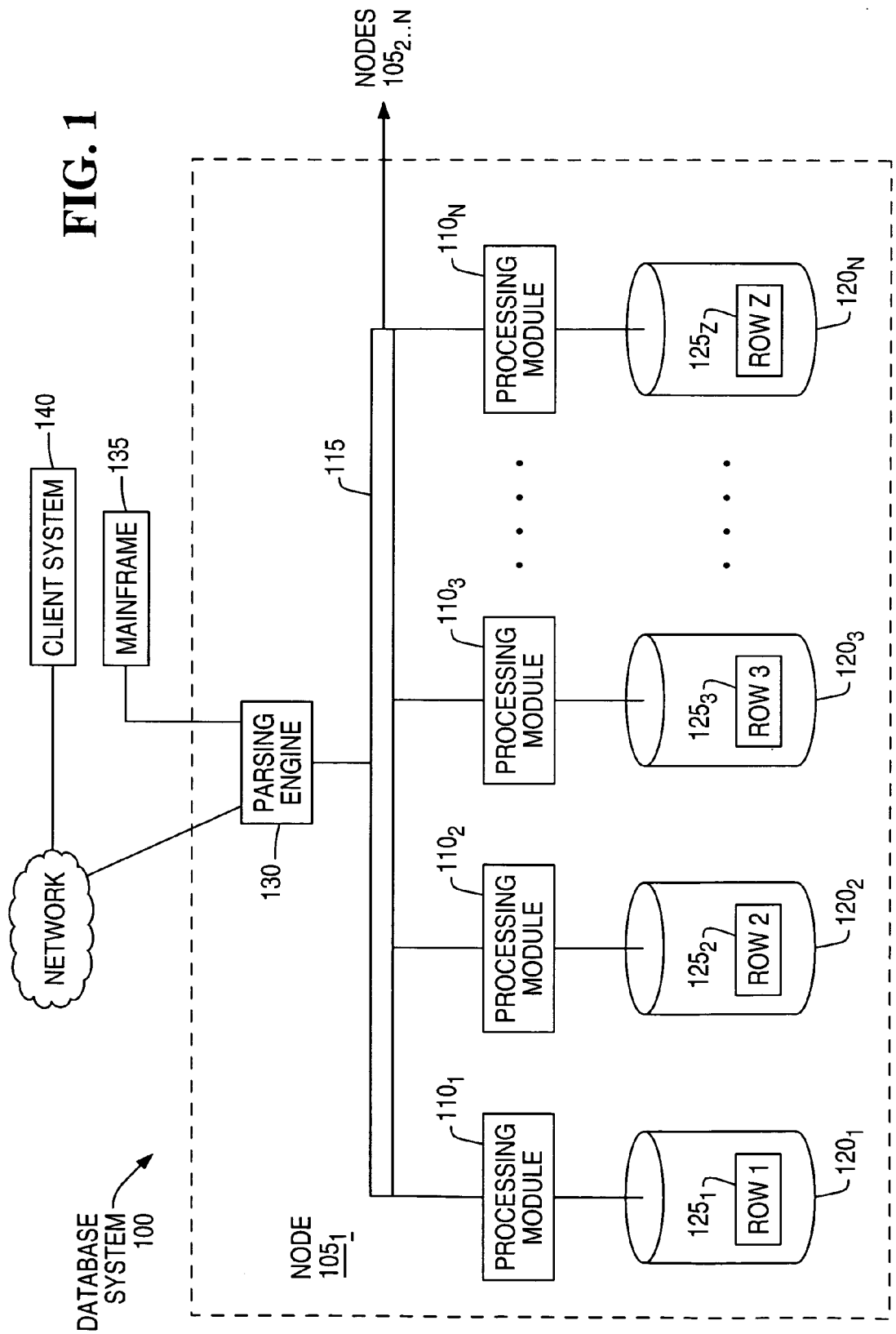
FIG. 1 is a block diagram of a node of a database system.

The partitioned table storage technique disclosed herein has particular application, but not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules as $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1...N}$ includes one or more disk drives. The DBS may include multiple nodes $105_{2...N}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

The rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated as a hash bucket. The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 2:
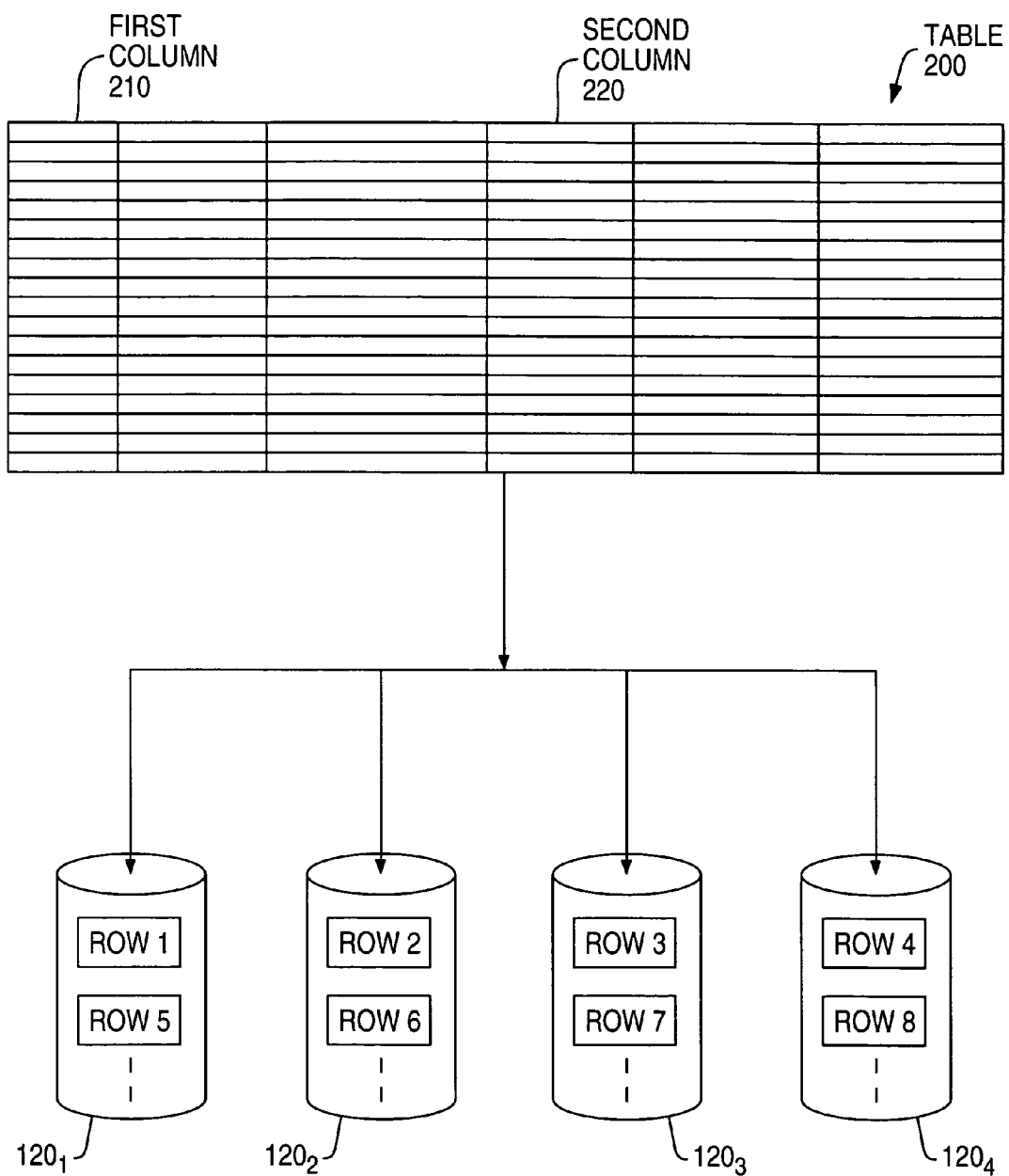
FIG. 2 is a flow diagram of table distribution process.

FIG. 2 shows the rows of a table be distributed. The table 200 contains a plurality of rows and is stored in a plurality of data storage facilities $120_{1-4}$ by the parsing engine 130 (not shown). For example, two columns 210, 220 can be designated as the primary index when the table is created. The hash function is then applied to the contents of columns 210, 220 for each row. The hash bucket portion of the resulting hash value is mapped to one of the data storage facilities $120_{1-4}$ and the row is stored in that facility. For example, if the primary index indicates a column containing a sequential row number and the hash function is the sum of remainder when the row number is divided by four and the value one, the first eight rows will be distributed as shown in FIG. 2.

Queries involving the values of columns in the primary index can be efficiently executed because the processing module $110_n$ having access to the data storage facility $120_n$ that contains the row can be immediately determined. For example, referring to FIG. 2, if values from row 2 are desired, the parsing engine 130 can apply the hashing function to determine that only processing module $110_2$ need to be used. As another example, an equality join between two tables that have the same primary index columns is very efficient. All of the rows that need to be joined are found in the same data storage facility $120_n$ and no movement of information from rows between the facilities is necessary.

Figure 3:
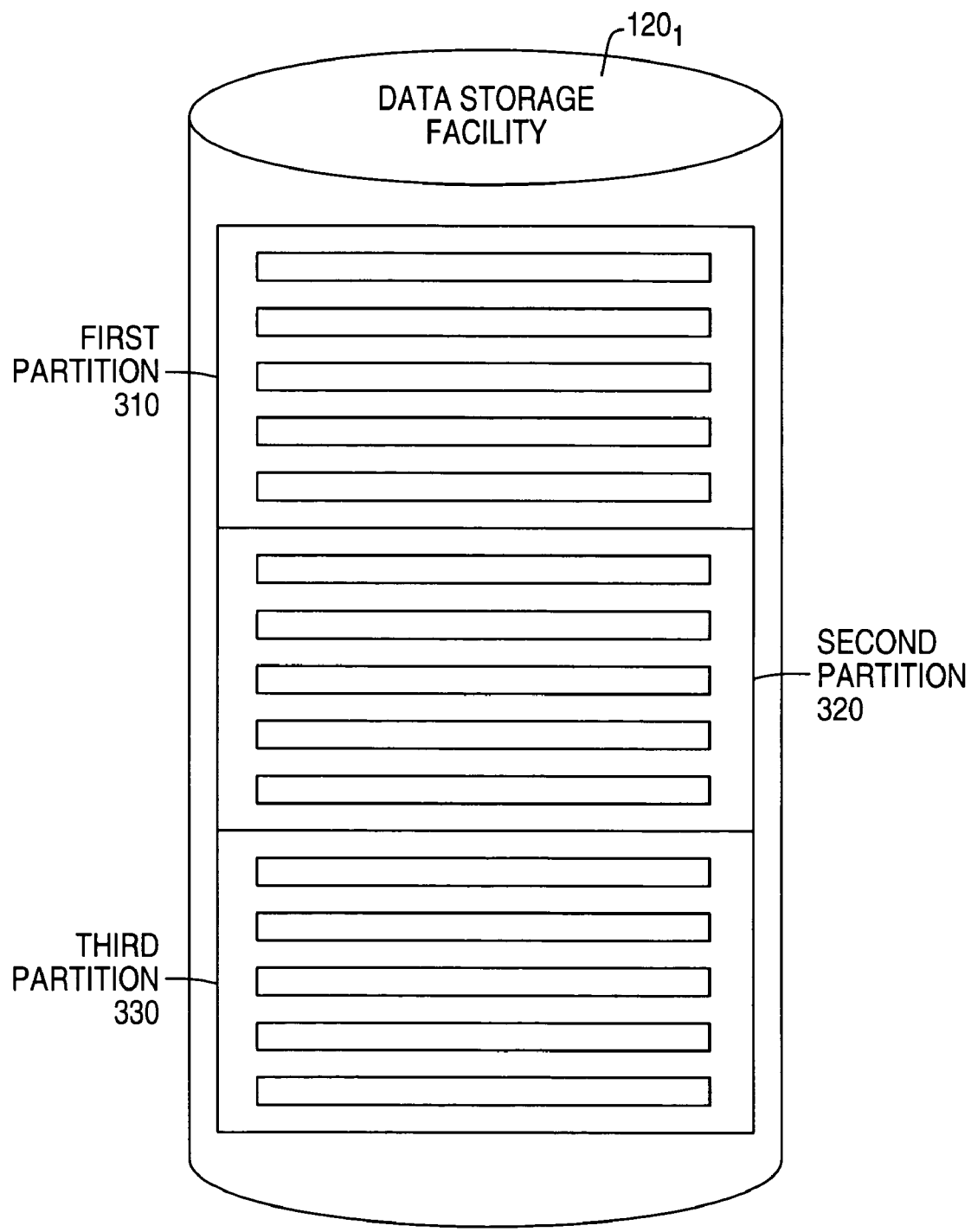
FIG. 3 illustrates an example partitioned database storage facility.

While the primary index of a table can be chosen for equality joins, for example the order number column of an order table, additional design features can make range searches, for example a range of dates from the date column, more efficient. Referring to FIG. 3, a partitioned database storage facility $120_1$ is shown. The rows are allocated to the storage facility $120_1$ as discussed above. The rows are organized within the storage facility $120_1$ in accordance with a row ID 400. The row ID is more specifically shown in FIG. 4. The row ID includes values associated with a partition function as well as values associated with the hash function and a uniqueness value. The rows stored in the storage facility $120_1$ are ordered at a top level by the result of the partition function. As a result, a first group of rows 310 has one partition function value. A second group of rows 320 has another partition function value. A third group of rows 330 has a third partition value. The groups 310,320,330 are ordered by their partition values and are also known as partitions.

The rows are also ordered with each partition. For example, the first partition 310 contains five rows. Those rows are stored within that partition 310 in the order of the hash result for each row. A uniqueness value is also maintained for each row. No two rows with the same partition and hash value in a table can have the same uniqueness value. The uniqueness values are determined when the rows are added to the table. For example, a sequential number (the next uniqueness number after the highest one currently being used) or any currently unused number can be used as the uniqueness value. If two rows are in the same partition and have the same hash value, their order is determined by their uniqueness values, which by definition cannot be identical. The uniqueness value does not play a role in ordering rows that have different partition or hash values. In an alternate implementation, uniqueness values are not assigned to the rows and the order of rows with identical hash values is not determined.

A partition function can return a number for a row based on the range of values into which that row's value in a certain column falls. For example, if an order table in a database has the order number column as that table's primary index, the partition function can correspond to the month of the order date. In that situation, the rows of the order table would be distributed to storage facilities based on the result of applying the hash function to the order number. In each storage facility, the rows would be ordered based on a monthly range of dates. For example, the first partition 310 could include all rows assigned to that storage facility with orders in January 2001. The second partition 320 could include all rows for orders in February 2001. Within each partition the rows are in the order of the hash value and, where hash values are the same, in order by uniqueness value. Such a partitioned table could be efficiently searched on ranges by eliminating partitions from the required search. For example, if all orders for a certain product during a two-month period are desired, only two partitions on each storage facility would need to be checked for the specified product. The monthly range is just one example of a possible partition function. Any type of function can be used.

Figure 4:
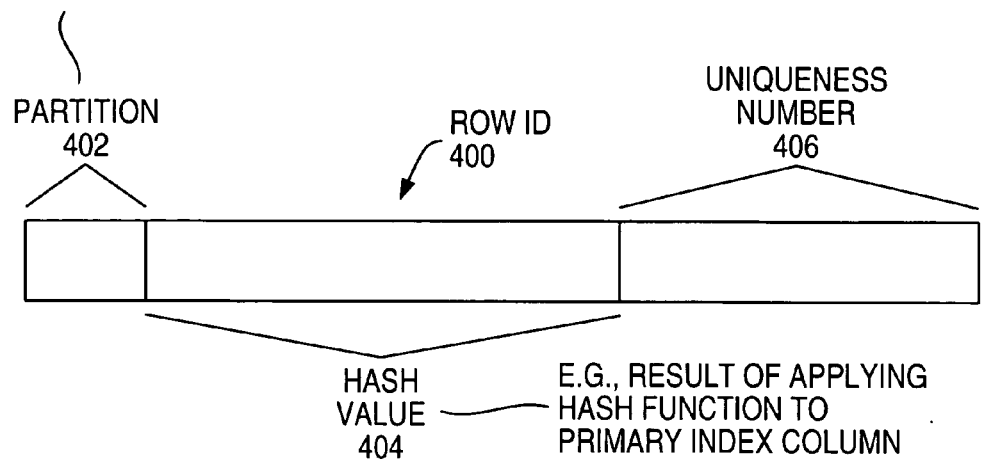
FIG. 4 is a data structure of a row identifier (row ID).

FIG. 4 shows a data structure of a row ID 400. A row ID 400 can be calculated for each row in order to allow quick, correct placement of a newly added row. The database system may store the row ID for each row as a column of that row in addition to the columns defined when the row is created. A complete row ID is not required to be stored with each row to implement the invention (if a uniqueness value is used in the row ID, that value must be stored with the row). As one example, the processing module $110_n$ could recalculate the partition function and hash function each time a row is accessed to determine the row ID for the row. The row ID 400 is FIG. 4 has three parts: the partition value 402, the hash value 404, and the uniqueness value 406. In one implementation of the invention the partition value 402 is one byte long, the hash value 404 is four bytes long, and the uniqueness value is three bytes long. As a result, in that implementation up to 256 partitions can be utilized in storing rows in a storage facility $120_n$. Using the order table example, over twenty years of orders could be kept in one-month partitions. The hash value 404 in that implementation could be one of $2^{32}$ possible values. That implementation would allow $2^{24}$ uniqueness values 406. This implementation retains the existing 64-bit size of the row ID the Teradata implementation. A larger number of possible hash values increases the number of data storage facilities that can be used to store rows of the database and reduces the chance that multiple rows will have the same hash value. A larger number of possible uniqueness values allow tables with larger numbers of rows with the same partition and hash value to be stored.

The row ID 400 in another implementation includes a 2-byte partition value 402, a 4-byte hash value 404, and a 4-byte uniqueness value 406. In this implementation, more partitions can be used to store rows and tables with more rows, because of the increase in uniqueness numbers, can be stored. The row ID size is ten bytes overall. Many other row ID's could be implemented that are two-or three-level organization of rows in data storage.

Figure 5:
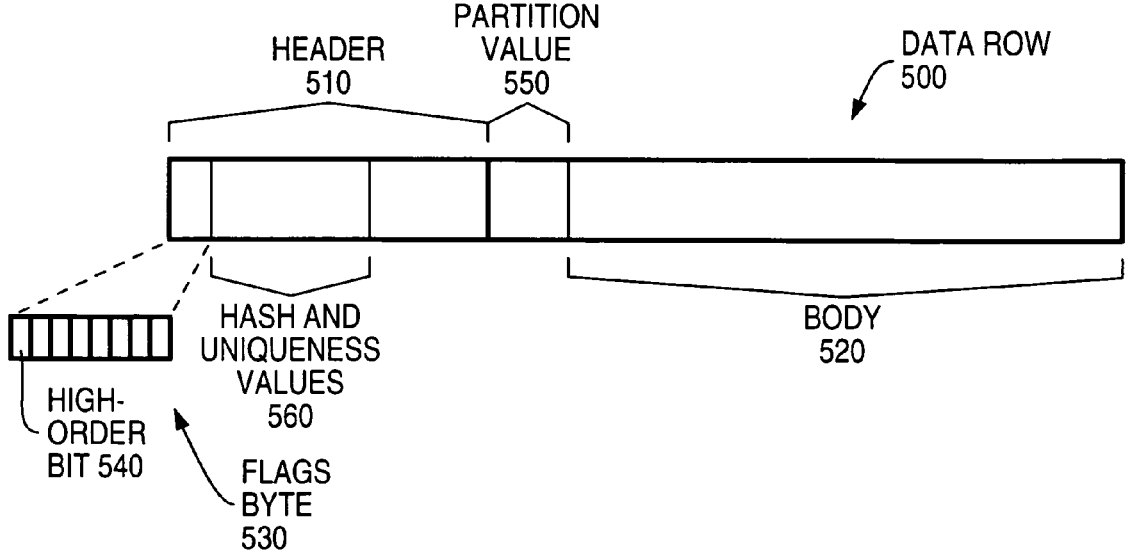
FIG. 5 is a data structure for a data row.

FIG. 5 shows a data structure for a data row. In this implementation, the 10-byte row ID is added to a system initially configured for using an 8-byte row ID. Many of the tables in the database are not partitioned. In that case, the 2-byte partition value 402 would be zero for all rows. Partitioned tables would have partition values other than zero for the rows. One implementation of the invention compresses the 2-byte partition value for the nonpartitioned table rows so that a header defined for an 8-byte row ID can remain unchanged, while including a mechanism for determining the row ID for partitioned table rows. The data row 500 includes a header 510 and a body 520. The header 510 includes at least one bit that is unused in the initial header definition and assigned a reference value. For example, the header 510 can include a Flags byte 530 that includes a high-order bit 540 that is always initialized as zero prior to the addition of partitioning functionality. The high-order bit 540 is used to indicate whether the data row 500 is from a partitioned or nonpartitioned table. If the data row 500 is from a nonpartitioned table, the high-order bit 540 remains zero and the row ID is constructed from the 8-bytes of hash and uniqueness values 560 preceded by 2-bytes of zero, the partition value for a nonpartitioned table. If the data row 500 is from a partitioned table, the high-order bit 540 is set to 1 and the 2-byte partition value 550 is the first portion of the body 520. In one implementation, each row has a row descriptor for identifying the portions of the body 520. The row descriptor is adjusted to account for the addition of the 2-byte partition value 550 at the beginning of the body. Thus, a routine can construct the 10-byte row ID for the nonpartitioned data rows by noting the high-order bit 540 state and adding 2-bytes indicating a zero partition value to the hash and uniqueness values 560 without referencing the row descriptor.

FIG. 6 shows a data structure for an index row 600. In a specific implementation, an index row 600 consists of an identifying rowid (in the row header) 610, rowids that reference rows in the table 620, and other data (such as the index value) 630. The identifying rowid 610 of an index row 600 is handled the same as for the data row 500. As with the data row 500, a descriptor exists for the contents of the index row 600. This descriptor indicates the size of data values in the row. For a nonpartitioned table, the descriptor indicates that the rowids have a size of eight bytes and the partition number of zero can be assumed. For a partitioned table, the referenced rowids are extended with the 2-byte partition number and the descriptor would indicate they have a size of ten bytes Adding the 10-byte row ID to a system initially configured for using an 8-byte row ID, can also involve modifications to disk-based file system structures to include the partition number. In one specific implementation, the disk-based file system structures include cylinder index data blocks for identifying particular data. The firstrid and last-hash values in the cylinder index data block descriptors each need to each be extended by two bytes. For an upgrade, the old cylinder indexes need to be converted; however, converting just the cylinder indexes should not take an excessive amount of time for an upgrade.

FIG. 7 shows the rows of two tables 710, 720 stored in partitions in two data storage facilities $120_{1,\,2}$. While the rows for each table are partitioned and ordered within the partitions, they are not mixed. If the two tables 710, 720 are each partitioned according to the same data and have the same primary index, equality joins between the two tables can be conducted within a subset of the storage of each storage facility. Primary indexes can be used to specify the storage locations for different tables within one data storage facility.

Different tables in a database system can have different partition functions. For example, the first table 710, an order table, can be partitioned by the month of the order date, while the second table 720, a customer table, is partitioned by the total average yearly purchases of that customer. The partition function for a table can be chosen to coincide with range calculations commonly performed on columns in response to queries. If queries that specify date ranges are common, it can be efficient to specify range of dates as the partition function. If queries with item types are common, it can be efficient to specify an item type designations as a partition function. Each function represents an implementation of the partitioned database system.

FIG. 8 shows a flow chart of an algorithm for defining and building a partitioned table in a database system. Initially, a table is created 810. One of the steps in creating a database table is defining the columns that will contain row data for the table 812. The database system can add columns such as a row ID to those specified. One or more columns are chosen as the primary index for the table 814. The primary index is used as the input to the hash function. One or more columns are also chosen as partitioning columns 816. A function is specified that uses the values of the partitioning columns for each row to calculate the partition of that row 818. The partition function itself may define the partition columns combining steps 816 and 818.

Once a table has been defined, users are allowed to fill the table by creating rows 820. The data in the new row is used to determine the hash value and hash bucket by applying the hash function to the columns of the primary index 822. The data storage facility in which the row is stored is determined by the hash bucket in combination with the hash bucket map 824. The partition function is applied to the values in the partitioning columns 826. In one implementation, a uniqueness number is also assigned to the row 828. The rows for that table in a particular data storage facility are then located in order of the partitions 830. Within the partitions, the rows are located in order of the result of the hash function, the hash value 832. Any rows in a partition that share that hash value are then ordered by the uniqueness value if there is one 834; otherwise, there is no particular order within the rows that have the same partition and hash value.

In one implementation, the new row is placed in the proper position relative to the already ordered previously-input rows. In another implementation, many rows can be added without placement in partitions, hash order and uniqueness order, and then sorting according to steps 730, 732, and 734 occurs before the table is accessed for queries. Other implementations can be used to store rows according to two different functions.

The text above described one or more specific implementations of a broader invention. The invention also is carried out in a variety of alternative implementations and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other implementations are also within the scope of the following claims.

We claim:

1. A partitioned database system comprising:
 a plurality of storage facilities, each storage facility including data representing a plurality of table rows;
 wherein table rows in each storage facility that correspond to a specific table are logically ordered according to a row identifier (row ID);
 the row ID comprises a first value based on one or more columns of the table and a second value based on one or more columns of the table;
 the first value of the row ID is predominate in determining the order of the rows in the storage facilities and the second value determines the order of those rows with identical first values, the second value being the result of applying a hash function to a value in at least one specified column; and
 table rows are distributed among the plurality of storage facilities based on the second value.

2. The partitioned database system of claim 1, wherein:
 the row ID further comprises a third value and the third value determines the order of rows with identical first and second values.

3. The partitioned database system of claim 1, wherein:
 the first value of the row ID corresponds to ranges of values in a column.

* * * * *